Sept. 7, 1937.　　　　E. J. NIGH　　　　2,092,654

MEAT KNEADER

Filed April 15, 1935

INVENTOR
Earl J. Nigh
BY
ATTORNEY

Patented Sept. 7, 1937

2,092,654

UNITED STATES PATENT OFFICE 2,092,654

MEAT KNEADER

Earl J. Nigh, Kansas City, Mo., assignor to Foster L. Talge, Kansas City, Mo., doing business as Rival Manufacturing Company Application April 15, 1935, Serial No. 16,360

1 Claim. (Cl. 17—29)

My invention relates to meat kneaders, and more particularly to a device for rendering meat tender.

The toughness in meat is generally caused by the presence of fibers of such strength and length that it is difficult to masticate. It has been found that pounding, mauling or kneading breaks the fibers and reduces their length, so that the meat is easy to cut and masticate.

One object of my invention is to provide a meat kneader of novel and improved construction.

Another object of my invention is to provide a meat kneader which is easy to take apart for cleaning.

Another object of my invention is to provide a meat kneader which will not pierce the meat and thus produce permanent distortion.

Another object of my invention is to provide a meat kneader which is convenient and simple to use.

In the accompanying drawing which forms a part of the instant specification and which is to be read in conjunction therewith:

In general, my invention contemplates the provision of a pair of rollers assembled to act as a unit, provided with blunt teeth which will break the fibers of the meat and yet not pierce the meat.

Figure 2:
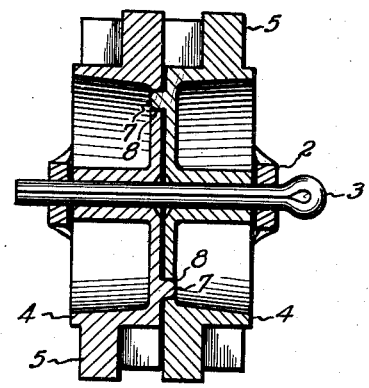
Figure 2 is a sectional view of the meat kneader shown in Figure 1.
Figure 3:
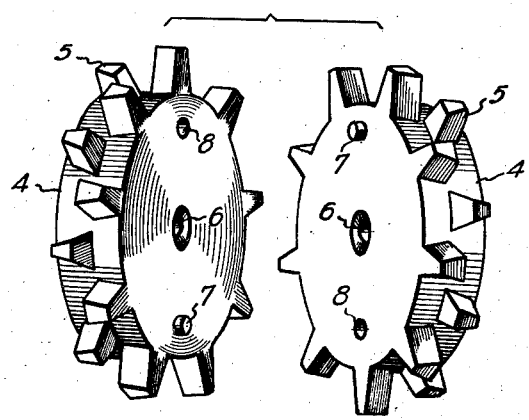
Figure 3 is a perspective view of the rollers of my meat kneader disassembled for cleaning.

More particularly, referring now to the drawing, a handle member 1 is provided with a bifurcated end 2. Each tine of the bifurcation is provided with a hole for the reception of a bearing pin 3 which may be a cotter pin or the like. A pair of rollers 4 is mounted upon the pin 3 for rotation thereon. The peripheral surface of the rollers is provided with blunt, teeth-like projections 5 distributed thereover. The rollers are provided with central holes 6 through which the pivot pin 3 passes. One lateral surface of each roller 4 is provided with a dowel pin 7 and a recess 8. The arrangement is such that the dowel pin of one roller is adapted to fit in a recess of an adjacent roller, thus interlocking the rollers, as can readily be seen by reference to Figure 2.

Figure 1:
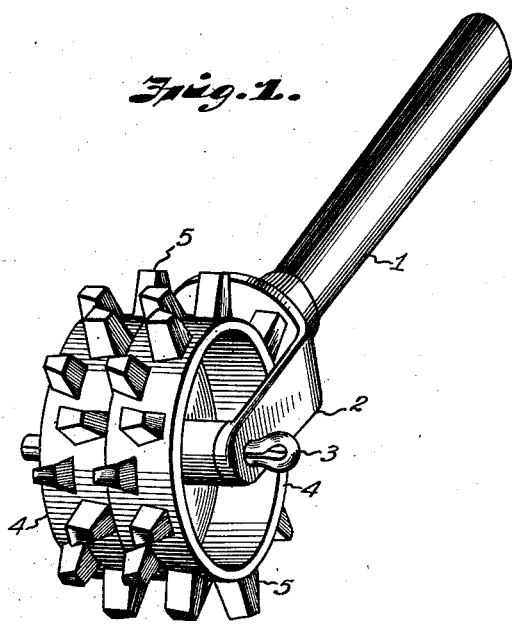
Figure 1 is a perspective view of a meat kneader embodying my invention.

In use, the rollers are assembled as shown in Figure 1. The meat is laid upon a bread board or the like and the rollers passed over the surface of the meat a number of times, using pressure. The repeated kneading effected by the projections 5 breaks the fibers of the meat and renders it tender.

Having thus described my invention, what I claim is:

A meat kneader comprising in combination a handle member having a bifurcated end, a pair of roller members disposed between said bifurcations, each of said roller members being provided with a pair of rows of staggered blunt teeth extending from the peripheral surfaces thereof, a pin passing through said roller members centrally thereof and supported by said bifurcated end, interlocking means formed on adjacent surfaces of roller members adapted to interlock the roller members in a predetermined position for rotation as a unit.

EARL J. NIGH.